(12) United States Patent
Lee

(10) Patent No.: US 12,308,025 B2
(45) Date of Patent: May 20, 2025

(54) METHOD OF CONTROLLING ELECTRONIC DEVICES

(71) Applicant: LG ELECTRONICS INC., Seoul (KR)

(72) Inventor: Jongwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 508 days.

(21) Appl. No.: 17/596,148

(22) PCT Filed: Jun. 4, 2020

(86) PCT No.: PCT/KR2020/007275
§ 371 (c)(1),
(2) Date: Dec. 3, 2021

(87) PCT Pub. No.: WO2020/246824
PCT Pub. Date: Dec. 10, 2020

(65) Prior Publication Data
US 2022/0230637 A1 Jul. 21, 2022

(30) Foreign Application Priority Data
Jun. 5, 2019 (KR) .................. 10-2019-0066322

(51) Int. Cl.
*G10L 15/22* (2006.01)
*G05B 19/042* (2006.01)
(Continued)

(52) U.S. Cl.
CPC ............ *G10L 15/22* (2013.01); *G05B 19/042* (2013.01); *G10L 15/063* (2013.01); *G10L 15/30* (2013.01);
(Continued)

(58) Field of Classification Search
CPC ... G10L 15/22; G10L 2015/223; G10L 15/30; G10L 15/26
See application file for complete search history.

(56) References Cited

U.S. PATENT DOCUMENTS

2016/0155443 A1 6/2016 Khan et al.
2017/0345422 A1* 11/2017 Yang ...................... G06F 3/167
(Continued)

FOREIGN PATENT DOCUMENTS

CN 107408386 A 11/2017
CN 108022590 A 5/2018
(Continued)

*Primary Examiner* — Mark Villena
(74) *Attorney, Agent, or Firm* — Birch, Stewart, Kolasch & Birch, LLP

(57) ABSTRACT

The present disclosure discloses a method of controlling a plurality of electronic devices including steps of (a) collecting a voice by the plurality of electronic devices, (b) extracting a voice command based on information on the collected voice by each of the plurality of electronic devices, (c) determining one of the plurality of electronic devices collecting the voice as a master and the other of the plurality of electronic devices collecting the voice as a slave, (d) determining a target electronic device of the voice command through analyzing the voice command by the master, and (e) transmitting the voice command to the target electronic device by the master.

12 Claims, 7 Drawing Sheets

(51) Int. Cl.
*G10L 15/06* (2013.01)
*G10L 15/30* (2013.01)

(52) U.S. Cl.
CPC ............ *G05B 2219/23386* (2013.01); *G10L 2015/0635* (2013.01); *G10L 2015/223* (2013.01)

(56) References Cited

U.S. PATENT DOCUMENTS

| | | |
|---|---|---|
| 2018/0040322 A1 | 2/2018 | Mixter et al. |
| 2018/0122378 A1 | 5/2018 | Mixter et al. |
| 2018/0228006 A1 | 8/2018 | Baker et al. |
| 2018/0233137 A1 | 8/2018 | Torok et al. |
| 2018/0277107 A1* | 9/2018 | Kim ................ G10L 15/22 |
| 2018/0286391 A1* | 10/2018 | Carey ............... G10L 15/22 |
| 2019/0013018 A1 | 1/2019 | Rekstad |
| 2019/0081810 A1 | 3/2019 | Jung |
| 2019/0090056 A1* | 3/2019 | Rexach ............... G06F 3/167 |
| 2019/0103899 A1 | 4/2019 | Lee et al. |
| 2019/0355365 A1* | 11/2019 | Kim ................ G06F 1/3209 |
| 2019/0373152 A1* | 12/2019 | Tan .................... A47G 1/02 |
| 2020/0125398 A1* | 4/2020 | Araki ............... G06Q 10/101 |
| 2020/0184929 A1* | 6/2020 | Liu ................... G06F 3/1454 |
| 2021/0335354 A1* | 10/2021 | Park ................. G10L 15/063 |

FOREIGN PATENT DOCUMENTS

| | | |
|---|---|---|
| CN | 108630204 A | 10/2018 |
| CN | 109087637 A | 12/2018 |
| CN | 109377987 A | 2/2019 |
| CN | 109697992 A | 4/2019 |
| CN | 111033610 A | 4/2020 |
| EP | 3 379 534 A1 | 9/2018 |
| JP | 2018-159918 A | 10/2018 |
| KR | 10-2017-0131465 A | 11/2017 |
| KR | 10-2018-0135817 A | 12/2018 |
| KR | 10-2019-0021407 A | 3/2019 |
| KR | 10-2019-0044523 A | 4/2019 |
| TW | M572108 U | 12/2018 |

* cited by examiner

METHOD OF CONTROLLING ELECTRONIC DEVICES

TECHNICAL FIELD

The present disclosure relates to a method of controlling a plurality of electronic devices, and more particularly, to a method of controlling a plurality of electronic devices that determines priority and a target electronic device between voice command recognition devices without server intervention.

BACKGROUND ART

Home appliances are electrical appliances provided in homes, for example, a refrigerator, an air conditioner, a cooking appliance, a cleaner (a vacuum cleaner), or so on. Conventionally, in order to operate such a home appliance, a user directly operates in a state that the user is close to the home appliance or remotely controls the home appliance using a remote controller or the like.

However, as a development of communication technology in recent years, technology that a user inputs a command using a voice for an operation of a home appliance and the home appliance operates by recognizing a content of the voice input to the home appliance has been introduced.

The conventional home appliance includes a voice recognition system, a controller, a memory, and a driving unit. When the user speaks or gives a voice corresponding to a specific command, the home appliance collects the voice and analyzes the collected voice using the voice recognition system.

As a result of analyzing the collected voice, a text corresponding to the voice may be extracted. The controller may compare first text information, which is extracted, with second text information, which is stored in the memory, and determines whether the texts match each other or not.

When the first text information and the second text information match each other, the controller may recognize a predetermined function of a home appliance corresponding to the second text information.

Then, the controller may operate the driving unit based on the recognized function.

According to such conventional home appliances, when a voice given by a user is input to a plurality of home appliances capable of recognizing a voice, a confusion in an operation of the home appliance may occur.

In addition, in the convention home appliances, different feature points (start commands) for home appliances are used to prevent to the confusion. However, in this instance, a user should memorize a different starting command for each home appliance.

In addition, in the conventional home appliances, an electronic device or a home appliance that does not have a voice input unit cannot be controlled by a voice command.

In addition, in the conventional home appliances, intervention of a server is necessary to select priority of a voice command among a plurality of electronic devices or home appliances.

SUMMARY

Technical Problem

The present disclosure is for providing a method controlling a plurality of electronic devices being able to operate a plurality of electronic devices through using a voice of natural language or a feature point (a start command) by a user. Accordingly, the user does not need to memorize or distinguish a feature point of each electronic device.

The present disclosure is also for providing a method controlling a plurality of electronic devices being able to execute a voice command without additional server intervention and reduce a burden on a server since one of controllers of the plurality of electronic devices becomes a master to analyze a voice command, determine a target electronic device, and transmit the voice command to the target electronic device.

The present disclosure is further for providing a method controlling a plurality of electronic devices being able to manipulate or operate an electronic device not having a voice recognition device among the plurality of electronic devices.

The present disclosure is further for providing a method controlling a plurality of electronic devices being able to manipulate or operate an electronic device located at a location where a voice of a user cannot be collected by the voice of the user.

The present disclosure is further for providing a method controlling a plurality of electronic devices being able to accurately determine a target electronic device based on voice information and operation information of each electronic device.

The present disclosure is not limited to the above, and problems to be solved that are not mentioned will be clearly understood by those skilled in the art from the following description.

Technical Solution

A method of controlling a plurality of electronic devices according to the present disclosure relate to a method of controlling a plurality of electronic devices connected by a network. The method includes steps of (a) collecting a voice by the plurality of electronic devices, (b) extracting a voice command based on information on the collected voice by each of the plurality of electronic devices, (c) determining one of the plurality of electronic devices collecting the voice as a master and the other of the plurality of electronic devices collecting the voice as a slave, (d) determining a target electronic device of the voice command through analyzing the voice command by the master, and (e) transmitting the voice command to the target electronic device by the master.

The step (c) may be executed when the plurality of electronic devices extract the same voice command at the same time.

In the step (c), one of the plurality of electronic devices collecting the voice may be randomly determined as the master.

In the step (c), an electronic device that collects the voice most loudly among the plurality of electronic devices collecting the voice may be determined as the master.

In the step (c), an electronic device that collects the voice with the highest accuracy among the plurality of electronic devices collecting the voice may be determined as the master.

In the step (d), the master may determine an electronic device operable according to the voice command among the master and the slave as the target electronic device.

In the step (d), when there are a plurality of electronic devices operable according to the voice command among the master and the slave, the master may determine an electronic device that collects the voice with the highest accuracy among the plurality of electronic devices collecting the voice as the target electronic device.

In the step (d), when there are a plurality of electronic devices operable according to the voice command among the master and the slave, the master may determine an electronic device that collects the voice most loudly among the plurality of electronic devices as the target electronic device.

In the step (d), when there are a plurality of electronic devices operable according to the voice command among the master and the slave, the master may determine one of the plurality of electronic devices operable according to the voice command based on a pre-stored command pattern of a user as the target electronic device.

In the step (d), when there is no electronic device operable according to the voice command among the master and the slave, the master may determine an electronic device operable according to the voice command among electronic devices other than the master and the slave as the target electronic device.

In the step (d), when there is no electronic device operable according to the voice command among the plurality of electronic devices connected by the network, the master may make one of the plurality of electronic devices operate as a wireless router and may transmit the voice command to the wireless router.

Each of the plurality of the electronic devices connected by the network may transmit whether the voice command is operable or not to the master.

The method may further include updating a voice command pattern of a user by the master.

The master may transmit the updated voice command pattern of the user to the plurality of electronic devices connected by the network.

Details of other embodiments are included in the detailed description and drawings.

Advantageous Effects

According to a method of controlling a plurality of electronic devices of this disclosure, there are one or more of the following effects.

First, according to the present disclosure, a user can operate a plurality of electronic devices through using a voice of natural language or one feature point, without memorizing or distinguishing a feature point (a start command) of each electronic device. Accordingly, a voice operation of an electronic device by using a voice of a user can be convenient.

Second, a voice command can be executed without additional server intervention since one of controllers of the plurality of electronic devices becomes a master to analyze a voice command, determine a target electronic device, and transmit the voice command to the target electronic device. Accordingly, a burden on a server can be reduced, an additional server is not needed, a cost of a server can be reduced, and the voice command can be executed even when the server and the electronic devices are disconnected.

Third, when an electronic device having a voice recognition device cannot perform an extracted voice command, an electronic device having a voice recognition device transmits a voice command to the electronic device not having the voice recognition device. Therefore, the electronic device not having the voice recognition device can be operated by a voice through the electronic device having the voice recognition device. Also, a cost can be reduced since there is no need to install a voice recognition device to the electronic device not having the voice recognition device.

Fourth, according to the present disclosure, an electronic device positioned at a location where a voice of a user cannot be collected can be manipulated or operated by the voice of the user. Thus, a voice command of the user can be executed regardless of a location of the user, and thus, it is convenient for the user.

Furthermore, since a target electronic device can be accurately determined based on voice information and operation information of each electronic device, and thus, a confusion of a voice command and a malfunction of the electronic device can be prevented.

The effects of the present disclosure are not limited to the above effects, and other effects that are not mentioned will be clearly understood by those skilled in the art from claims.

DETAILED DESCRIPTION

Figure 1:
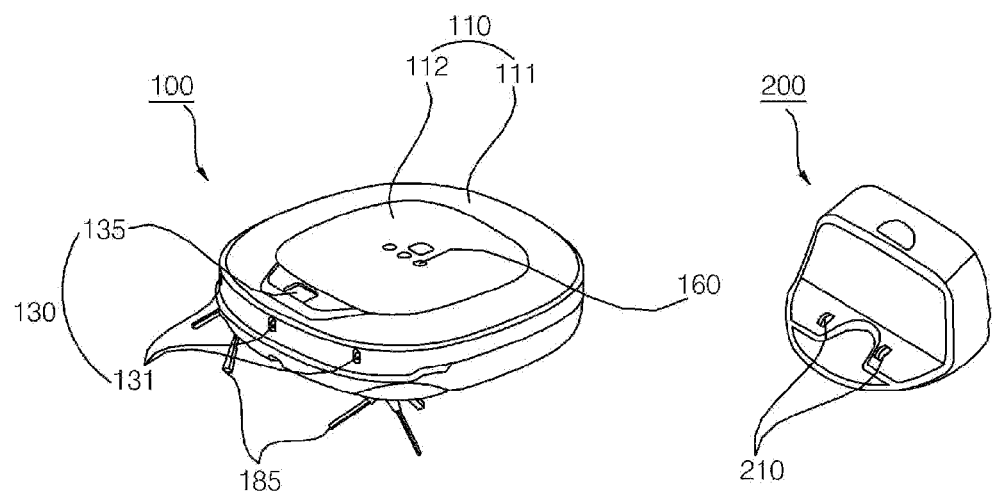
FIG. 1 is a perspective view showing a mobile robot and a charging station for charging the mobile robot according to an embodiment of the present disclosure.
Figure 2:
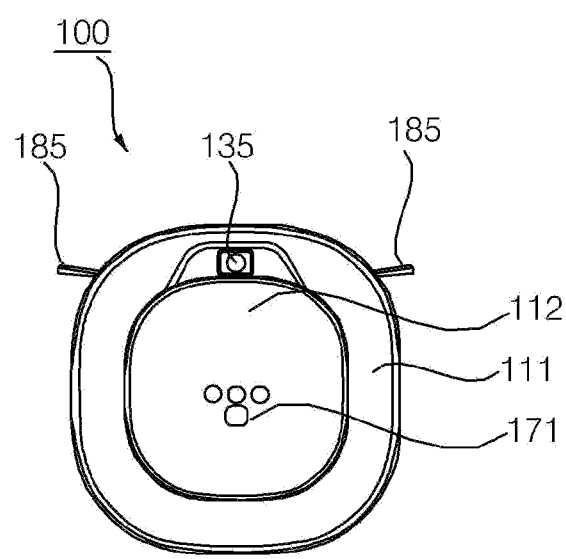
FIG. 2 is an elevation view of the mobile robot shown in FIG. 1 as viewed from an upper side.
Figure 3:
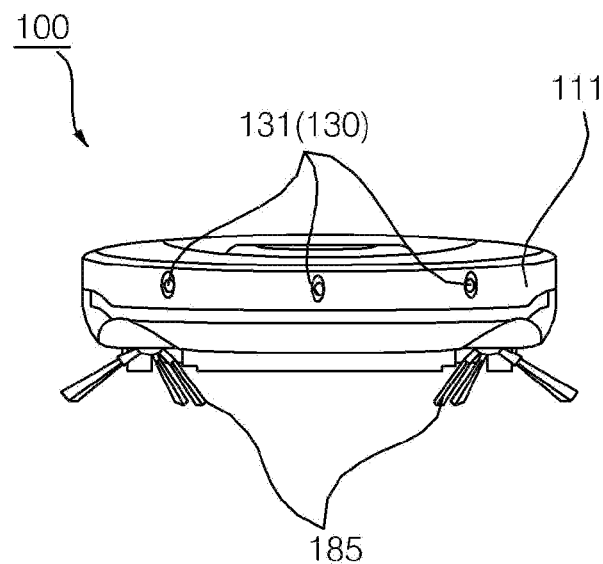
FIG. 3 is an elevation view of the mobile robot shown in FIG. 1 as viewed from a front side.
Figure 4:
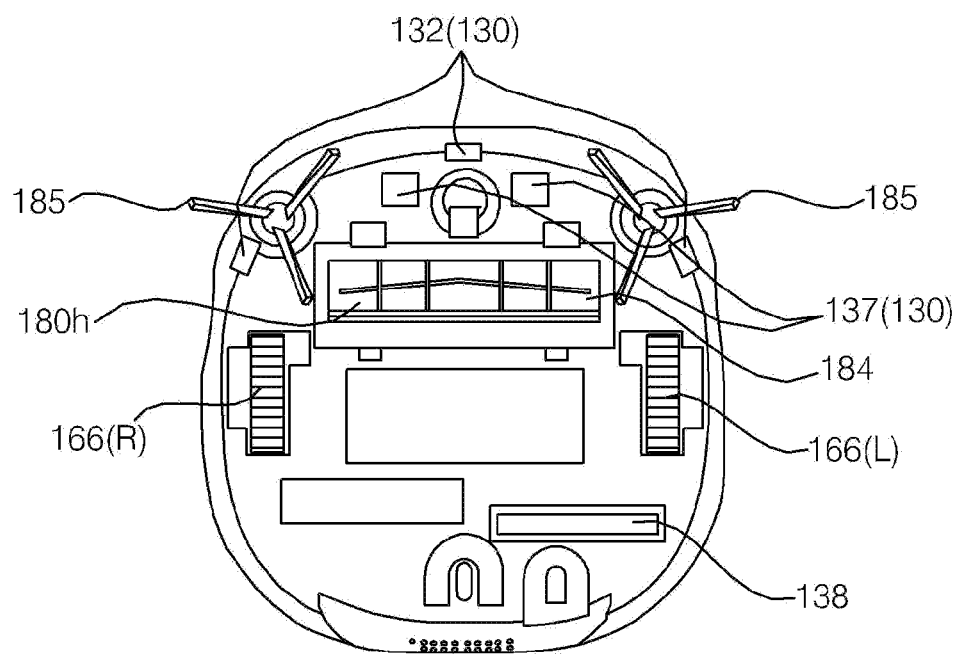
FIG. 4 is an elevation view of the mobile robot shown in FIG. 1 as viewed from a lower side.
Figure 5:
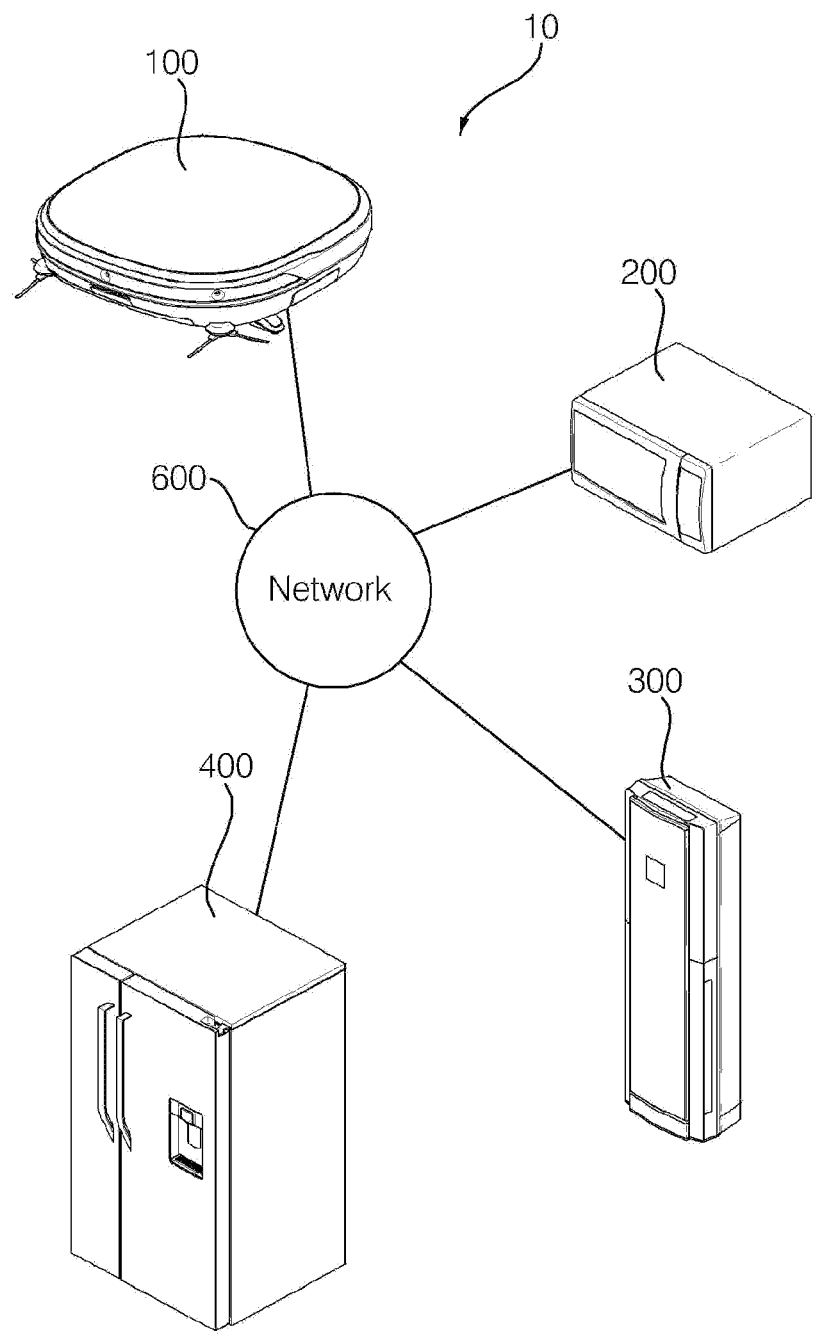
FIG. 5 shows electronic devices and an operation method of the electronic devices according to an embodiment of the present disclosure.

The present disclosure will be clarified with reference to embodiments described below in detail together with the accompanying drawings. However, the present disclosure is not limited to the embodiments disclosed below, but may be implemented in various different forms. These embodiments are just provided to make the present disclosure complete, and to fully disclose the present disclosure to a person having ordinary skill in the art to which the present disclosure pertains. A scope of the present disclosure is only defined by claims. The same reference numerals refer to the same components, units, members, portions, or elements throughout the specification.

The terms spatially relative, "below", "beneath", "lower", "above" and "upper" and the like may be used to easily describe a correlation of elements with other elements. Spatially relative terms should be understood in terms of the directions shown in the drawings, including different directions of components at the time of use or operation. For example, when inverting an element shown in the drawings, an element described as "below" or "beneath" of another element may be placed "above" of another element. Thus, the exemplary term "below" may include both downward and upward directions. The elements may also be oriented in a different direction, so that spatially relative terms can be interpreted according to orientation.

Terms used herein is for describing embodiments and is not intended to restrict the present disclosure. In this specification, singular forms include plural forms unless a context clearly dictates otherwise. It is noted that terms "comprises" and/or "comprising" used in the specification mean that mentioned elements, steps, and/or operations do not exclude a presence or an addition of one or more of other elements, steps, and/or operations.

Unless defined otherwise, all terms (including technical and scientific terms) used herein may be used in a sense commonly understood by a person having ordinary skill in the art to which the present disclosure pertains. In addition, predefined and commonly used terms are not ideally or excessively interpreted unless explicitly defined otherwise.

In the drawings, a thickness or a size of each components, units, members, portions, or elements is exaggerated, omitted, or schematically shown for convenience and clarity. In addition, a size and area of each component, unit, member, portion, or element does not entirely reflect an actual size or area.

Hereinafter, preferred embodiments of the present disclosure will be described with reference to the accompanying drawings.

A mobile robot 100 according to the present disclosure may include a robot capable of moving itself using wheels or the like, and may include a home helper robot, a robot cleaner, or so on.

Hereinafter, a mobile robot among a plurality of home appliances (a plurality of electronic devices) will be described with reference to FIGS. 1 to 4. A robot cleaner 100 is described as an example of a mobile robot, but the present disclosure is not necessarily limited thereto.

A mobile robot 100 may include a main body 110. Hereinafter, in defining each portion of the main body 110, a portion facing a ceiling in a driving area may be defined as an upper portion (refer to FIG. 2), a portion facing a floor in a driving area may be defined as a lower portion (refer to FIG. 4), and a portion facing a driving direction among a portion forming a circumference of the main body 110 between the upper portion and the lower portion may be defined as a front portion (refer to FIG. 3). In addition, a portion facing an opposite direction to the front portion of the main body 110 may be defined as a rear portion. The main body 110 may include a case 111 forming a space in which various components constituting the mobile robot 100 are accommodated.

The mobile robot 100 includes a sensing unit 130 that senses or detect information on an outside of the mobile robot 100.

The sensing unit 130 may sense or detect information on a driving area. The sensing unit 130 may detect an obstacle such as a wall, furniture, and a cliff on a driving surface. The sensing unit 130 may detect information on a ceiling. The sensing unit 130 may detect an object placed on the driving surface. Through the information detected by the sensing unit 130, the mobile robot 100 may perform mapping of the driving area. The sensing unit 130 may be formed of at least one sensor. The sensing unit 130 may detect intrusion detection information using a sensor. Specifically, the sensing unit 130 may detect image information at a periphery of the mobile robot.

In this instance, the intrusion detection information may include all information capable of detecting an external intrusion. For example, the intrusion detection information may include image information and sound information at a periphery of the mobile robot, image information and sound information at a periphery of a front door and a window.

Also, the intrusion detection information may include image information and sound information at peripheries of electronic devices connected to the mobile robot by a network.

For example, the sensing unit 130 may include an image sensing unit 135 that senses or acquires an image of an outside (at a periphery of the mobile robot). The image sensing unit 135 photographs a driving area. The image sensing unit 135 may include a digital camera. The digital camera may include at least one optical lens, an image sensor, and a digital signal processor (DSP). The image sensor may include a plurality of photodiodes (e.g., pixels) where an image is focused by light passing through the at least one optical lens. For example, the image sensor may be a complementary metal-oxide semiconductor (CMOS) image sensor. The digital signal processor may generate an image based on a signal output from the photodiodes. The digital signal processor may generate not only still images but also moving images formed of frames including still images.

The sensing unit 130 may include a distance detection unit 131 that detects a distance to an obstacle. The distance detection unit 131 may be disposed on the front portion of the main body 110. The distance detection unit 131 may detect an obstacle at a front side. A plurality of distance detection units 131 may be provided. The distance detection unit 131 may include ultrasonic waves or infrared rays. The distance detection unit 131 may include a camera.

The sensing unit 130 may include a cliff detection unit 132 that detects a cliff on a floor in a driving area. A plurality of cliff detection units 132 may be provided.

In addition, the sensing unit 130 may include an illuminance detection sensor (not shown) that detects an illuminance (a brightness level) of a driving area. A plurality of cliff detection units 132 may be provided.

The sensing unit 130 may further include a lower image sensor 137 for acquiring an image of a floor.

The mobile robot 100 may include a driving unit 160 that moves the main body 110. The driving unit 160 moves the main body 110 with respect to a floor. The driving unit 160 may include at least one driving wheel 166 that moves the main body 110. The driving unit 160 may include a driving motor. The driving wheels 166 may be provided on a left side and a right side of the main body 110, respectively. Hereinafter, the driving wheels 166 at the left side and the right side are referred to as a left wheel 166(L) and a right wheel 166(R).

The left wheel 166(L) and the right wheel 166 (R) may be driven by one driving motor, but if necessary, a left-wheel driving motor for driving the left wheel 166(L) and a right-wheel driving motor for driving the right wheel 166(R) may be provided, respectively. A driving direction of the main body 110 may be switched to a left side or a right side by differentiating rotational speeds of the left wheel 166(L) and the right wheel 166(R).

The mobile robot 100 may include a working unit that performs a predetermined work. The working unit performs a predetermined operation while generating a noise. For example, a noise is generated to rotate a brush for combing or sweeping, and a noise is generated for an operation of a suction motor for vacuum suction.

As an example, the working unit may be provided to perform housework such as cleaning (combing or sweeping, suction cleaning, mopping, etc.), washing dishes, cooking, washing clothes, and garbage disposal. As another example, the working unit may be provided to perform an operation such as manufacturing or repairing an appliance or a device.

As another example, the working unit may perform a work such as finding an object or repelling an insect.

As another example, the working unit may perform a security function that detects an external intruder, a dangerous situation, or so on. The working unit may include a camera for performing a security function, and, in this case, the image sensing unit 135 may perform a function of the camera performing the security function.

Hereinafter, in the present embodiment, it will be described that the working unit performs a cleaning operation. However, a type of a work by the working unit may be various and the working unit need not be limited to an example of the description.

The mobile robot 100 may clean a floor by the working unit while moving a driving area. The working unit may include an suction device for inhaling a foreign material, brushes 184 and 185 for performing combing or sweeping, a dust container (not shown) where a foreign material collected by the suction device or brushes is stored, and/or a mop portion (not shown) for performing mopping, or so on.

A suction port 180h through which air is inhaled may be formed at a lower surface of the main body 110. In the main body 110, an suction device (not shown) that provides suction power to allow air to be sucked through the suction port 180h and a dust container (not shown) where dust sucked with air through the suction port 180h is collected may be provided.

In a case 111, an opening for inserting and separating the dust container may be formed, and a dust container cover 112 that opens and closes the opening may be rotatably provided with respect to the case 111.

A main brush 184 and an auxiliary brush 185 may be provided. The main brush 184 may be a roll type including a brushing member exposed through the suction port 180h. The auxiliary brush 185 may have a brush member formed of a plurality of wings extending radially at a front side of the lower portion of the main body 110. The dust may be removed from a floor in a driving area by a rotation of the brushes 184 and 185, and the dust separated from the floor is sucked through the suction port 180h and collected in the dust container.

A battery 177 may supply power for an overall operation of the mobile robot 100 including power for a driving motor.

The battery 177 may be rechargeable. When the mobile robot 100 is docked to a charging station (a charging base) 200, a charging terminal 210 and a corresponding terminal 190 are connected to each other, thereby charging the battery 177. When a charge amount of the battery 177 is equal to or less than a predetermined value, the mobile robot 100 may perform a return driving to the charging station 200 for charging the battery 177. During the return driving, the mobile robot 100 may detect a position of the charging statin 200 itself.

The charging station 200 may include a signal transmission portion (not shown) that transmits a predetermined return signal. The return signal may be an ultrasonic signal or an infrared signal, but is not limited thereto.

Figure 6:
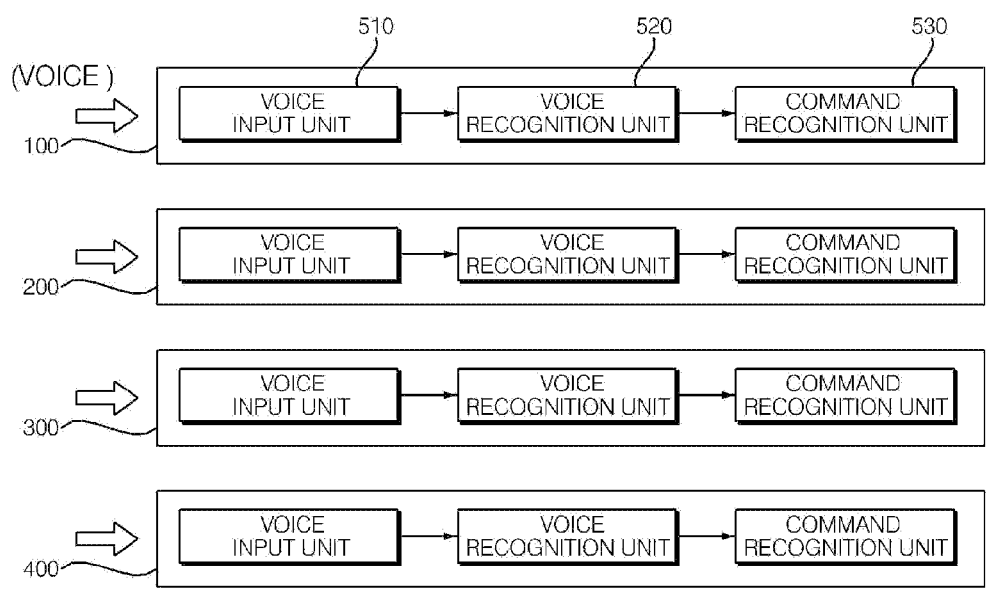
FIG. 6 shows a plurality of electronic devices according to an embodiment of the present disclosure.

Referring to FIG. 6, a voice recognition system 10 according to an embodiment of the present disclosure may include a plurality of electronic devices 100, 200, 300, and 400 capable of voice recognition.

For example, the plurality of smart electronic devices 100, 200, 300, and 400 may include a cleaner 100, a cooking appliance 200, an air conditioner 300, and a refrigerator 400.

The plurality of electronic devices 100, 200, 300, and 400 may be in a stand-by state capable of receiving voice. When a user sets a voice recognition mode for each smart electronic device, the stand-by state may be entered and maintained.

In this instance, the setting of the voice recognition mode may be performed by inputting through a predetermined input unit or by inputting a predetermined voice.

One of the plurality of electronic devices 100, 200, 300, and 400 may not include a voice input unit and a voice recognition unit. In this case, another electronic device having a voice input unit and a voice recognition unit may extract a voice command and provide it to the electronic device not including the voice input unit and the voice recognition unit.

Each electronic device may include a communication unit (not shown). The communication unit may be connected to a terminal and/or other electronic devices located in a specific area through one connection method of wired, wireless, and satellite communication methods to transmit and receive data with the terminal and/or the other electronic devices.

The communication unit may receive various command signals (terminal signals) from an external device such as other electronic device or a terminal. The communication unit may transmit information to be output to an external device such as a terminal.

For example, the communication unit may wirelessly communicate through wireless communication technologies such as IEEE 802.11 WLAN, IEEE 802.15 WPAN, UWB, Wi-Fi, Zigbee, Z-wave, Blue-Tooth, or so on. The communication unit may vary depending on a communication method of other device or a server to be communicated with.

Information of electronic devices 100, 200, 300, and 400 may be received on a network 600 through the communication unit, and the electronic devices 100, 200, 300, 400 may be controlled based on the received information.

The network 600 may refer to a communication network connected directly or indirectly by wire and/or wireless. That is, the phrase of 'the communication unit communicates with the terminal through the network 600' may include a case that the communication unit and the terminal communicate indirectly through a wireless router 400 or the like, as well as a case that the communication unit and the terminal communicate directly.

The network 600 may be formed based on technologies such as Wi-Fi, ethernet, zigbee, z-wave, and bluetooth.

The plurality of electronic devices 100, 200, 300, and 400 may be located together in a predetermined space. In this case, even if a user gives a predetermined voice command toward a specific electronic device among the plurality of electronic devices 100, 200, 300, and 400, other electronic devices may respond to the voice command.

Therefore, in the embodiment, when a predetermined voice is given by the user, a target electronic device that perform a voice command can be appropriately estimated or discriminated. In addition, according to the embodiment, when a voice command of a user is determined to a command for an electronic device that does not receive a voice, the electronic device that does not receive the voice can be controlled.

In detail, referring to FIG. 6, each of electronic devices 100, 200, 300, and 400 may include a voice input unit 510, a voice recognition unit (a speech recognition unit) 520, and a command recognition unit 530.

The voice input unit 510 may collect a voice given by the user. As an example, the voice input unit 510 may include a microphone.

The voice input unit 510 may extract the collected voice information. In this instance, the voice information may include loudness and accuracy of the voice. The accuracy of the voice is higher as there are fewer other noises when the voice is input, while the accuracy of the voice is lower as there are more other noises when the voice is input.

The voice recognition unit 520 may extract a text from the collected voice. The command recognition unit 530 may determines whether the text where a predetermined distinguishing word related to an operation of each electronic device is used is included or not, using the extracted text. The command recognition unit 530 may include a memory in which information on distinguishing words are stored.

When the collected voice includes a voice (information on a voice) in which a distinguishing word is used, the command recognition unit 530 extracts a voice command from the voice in which the distinguishing word is used.

Although the voice recognition unit 520 and the command recognition unit 530 are separately described to have different functions in the specification, but the voice recognition unit 520 and the command recognition unit 530 may be provided in one controller.

Figure 7:
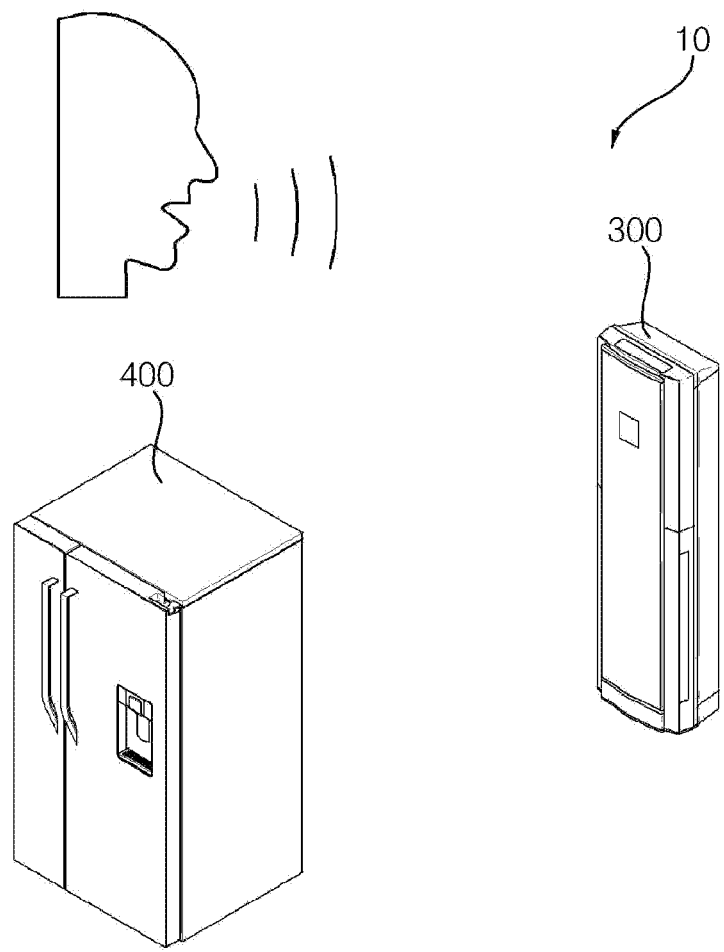
FIG. 7 shows a case in which a voice is given to a plurality of electronic devices.
Figure 8:
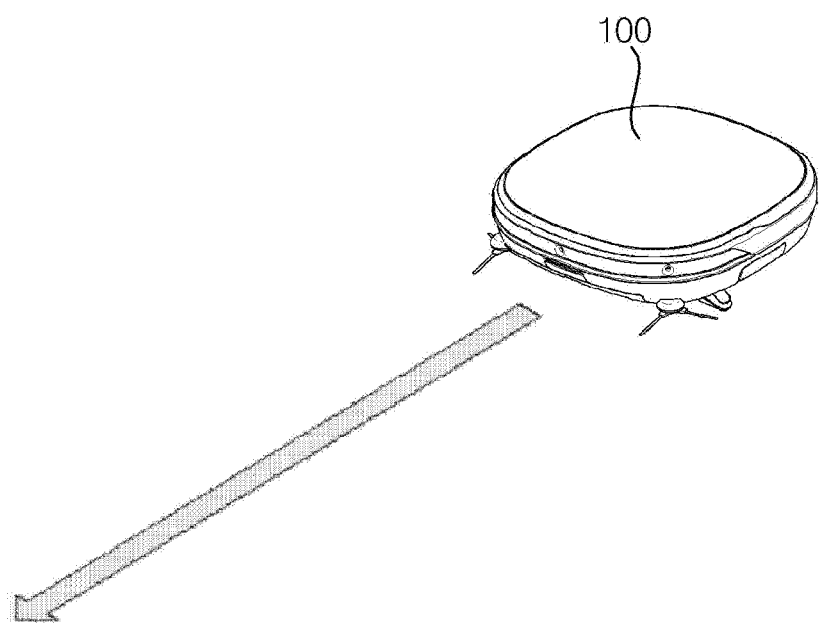
FIG. 8 shows an operation of a target electronic device among the plurality of electronic devices.

FIG. 7 shows a case in which voice is given to a plurality of electronic devices 100, 200, 300, and 400, and FIG. 8 shows an operation of a target electronic device among the plurality of electronic devices 100, 200, 300, and 400.

Referring to FIGS. 7 and 8, for example, when a user speaks "please clean" or gives a voice of "please clean" while there are an air conditioner 300 and a refrigerator 400 capable of voice recognition in a home, the air conditioner 300 and the refrigerator 400 analyze a voice and extract a voice command. As an example, it is recognized that a distinguishing word of "please clean" is used, and a voice command of "start cleaning" may be extracted.

One of the air conditioner 300 and the refrigerator 400 receiving the voice is designated as a master. For example, when the refrigerator 400 is designated as a master, the refrigerator 400 may determine a target electronic device using various algorithms and various factors.

The refrigerator 400 may determine an electronic device capable of performing a voice command of "start cleaning" in an order of electronic devices that receive a voice command and electronic devices that do not receive a voice command.

The refrigerator 400 may determine that the air conditioner 300 and the refrigerator 400 that receive the voice command cannot perform the voice command of "start cleaning", and may determine a cleaner 100 as a target electronic device being able to perform the voice command of "start cleaning". In this instance, the cleaner 100 is in a state in which the voice of the user is not input.

The refrigerator 400 may transmit the voice command to the cleaner 100, and the cleaner 100 that receives the voice command may start cleaning.

According to the embodiment, a user can operate a plurality of electronic devices through using a voice of natural language or one feature point, without memorizing or distinguishing a feature point (a start command) of each electronic device. Accordingly, an operation of an electronic device can be convenient by using a voice of a user.

In addition, a voice command can be executed without additional server intervention since one of controllers of the plurality of electronic devices becomes a master to analyze a voice command, determine a target electronic device, and transmit the voice command to the target electronic device. Accordingly, a burden on a server can be reduced, an additional server is not needed, a cost of a server can be reduced, and the voice command can be executed even when the server and the electronic devices are disconnected.

In addition, Third, when an electronic device having a voice recognition device cannot perform an extracted voice command, an electronic device having a voice recognition device transmits a voice command to the electronic device not having the voice recognition device. Therefore, the electronic device not having the voice recognition device can be operated by a voice through the electronic device having the voice recognition device. Also, a cost can be reduced since there is no need to install a voice recognition device to the electronic device not having the voice recognition device.

Figure 9:
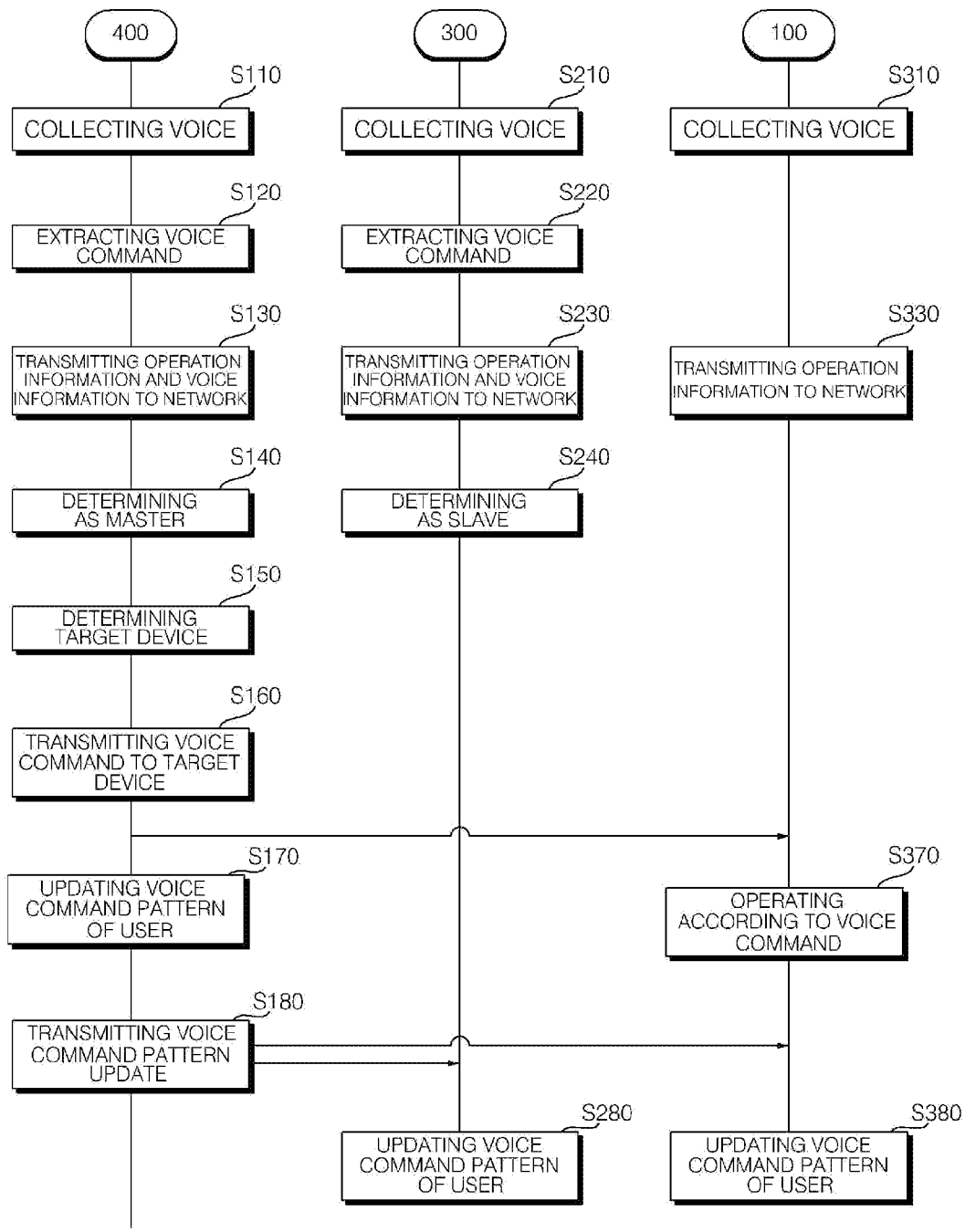
FIG. 9 is a flowchart showing a method of controlling a plurality of electronic devices.

Hereinafter, a method of controlling a robot cleaner according to the present disclosure will be described with reference to FIG. 9. The same or similar steps are denoted by the same reference numeral in a flowchart and overlapping descriptions will be omitted.

A control method may be performed by a controller (not shown) of each electronic device. A control method may be performed by a computer program implementing each step of a control method or may be a recording medium on which a program for implementing a control method is recorded. In the specification, 'recording medium' means a recording medium readable by a computer. A control method according to an embodiment may be performed by a control system of an electronic device including both hardware and software.

Each step and its combination in a flowchart of a control method may be performed by computer program instructions. The instructions may be mounted on a general-purpose computer or a special-purpose computer, etc., and the instructions may create means for performing functions described in a step or steps of a flowchart.

Also, in some embodiments, functions mentioned in steps may occur out of sequence. For example, two steps successively shown may be performed substantially simultaneously or may be performed in a reverse order depending on the corresponding function.

A control method according to an embodiment of the present disclosure may include step S110, S210, and S310 in which a voice is collected by a plurality of electronic devices 100, 200, 300, and 400, steps S120 and S220 in which a voice command is extracted based on information on the collected voice by each of the plurality of electronic devices, steps S140 and S240 in which one of the plurality of electronic devices 100, 200, 300, and 400 collecting the voice is determined as a master and the other is determined as a slave, a step S150 in which the master determines a target electronic device (a target device) of the voice command by analyzing the voice command, and a step S160 in which the master transmits the voice command to the target electronic device.

In each of the steps S110, S210, and S310 in which the voice is collected, each of the plurality of electronic devices 100, 200, 300, and 400 may collect a voice of a user. Specifically, each of a cleaner 100, an air conditioner 300, and a refrigerator 400, each capable of voice recognition in a home, may collect a voice of a user.

In each of the steps S120 and S220 in which the voice command is extract, each electronic device may extract the voice command based on information on the collected voice. A method of extracting the voice command is as described with reference to FIG. 6. Specifically, when the user speaks "please clean" or gives a voice of "please clean" in a state in which there are the air conditioner 300 and the refrigerator 400 each capable of voice recognition in the home, each of the air conditioner 300 and the refrigerator 400 may extract the voice command by analyzing the voice. As an example, it is recognized that a distinguishing word of "start cleaning" is used and a voice command of "start cleaning" may be extracted.

In the steps S140 and S240 of determining the master and the slave, among the plurality of electronic devices 100, 200, 300, and 400 that have collected the voice, one is determined as a master and the other is determined as a slave.

The step of determining one as a master and the other as a slave, among the plurality of electronic devices 100, 200, 300, and 400 that have collected the voice, is executed when the plurality of electronic devices 100, 200, 300, and 400 extract the same voice command at the same time. In this instance, the same time may mean a time range including a certain range of errors.

For example, when a user speaks "please clean" or give a voice of "please clean" in a state where there are an air conditioner 300 and a refrigerator 400 together, if the air conditioner 400 and the refrigerator 500 analyze the voice and extract a voice command of "start cleaning", it may be considered that the plurality of electronic devices 100, 200, 300, and 400 extract the same voice command at the same time.

The plurality of electronic devices 100, 200, 300, and 400 may provide basic data related to the determination of the master and the slave to a network 600, or provide their own operation information to the network 600 (S130, S230, S330). The operation information of each electronic device may be stored in a memory in advance.

In detail, the air conditioner 300 and the refrigerator 400, which have collected the voice and have extracted the voice command, may provide the network 600 with operation information, including whether an operation according to the extracted voice command is possible or not, and voice information, including loudness and accuracy of the collected voice. The cleaner 100 may provide operation information including a voice command that can be operated by the cleaner 100 to the network 600.

As a method in which a master is determined among the plurality of electronic devices 100, 200, 300, and 400 that have collected the voice, various methods may be used. For example, one of the plurality of electronic devices 100, 200, 300, and 400 that have collected the voice may be randomly determined as the master. As another example, an electronic device that has collected the voice most loudly among the plurality of electronic devices 100, 200, 300, and 400 that have collected the voice may be determined as a master. As still another example, an electronic device that has collected the voice with the highest accuracy among the plurality of electronic devices 100, 200, 300, and 400 that have collected the voice may be determined as a master. As yet another example, an electronic device that has an IP address having the lowest number among the plurality of electronic devices 100, 200, 300, and 400 that have collected the voice may be determined as a master.

More particularly, among the air conditioners 400 and refrigerators 500 that have collected the voice, the refrigerator 400 that has collected the voice most loudly and with the most accuracy may become a master.

In the step S150 in which the target electronic device is determined, the master may determine a target electronic device of the voice command by analyzing each voice command. Methods that the master determines the target electronic device may be various.

The master may determine the target electronic device in consideration of whether an operation according to the voice command is possible or not, accuracy of the voice, and loudness of the voice. In this instance, the target electronic device may mean an electronic device that executes a voice command of a user.

For example, the master may determine an electronic device operable according to a voice command among the master and the slave as a target electronic device. In consideration of a location where a user gives a voice command, an electronic device that has collected the voice may have priority of executing the voice command.

As another example, when there are a plurality of electronic devices operable according to a voice command among the master and the slave, the master may determine an electronic device that has collected the voice with the highest accuracy among the plurality of electronic devices 100, 200, 300, and 400 as a target electronic device.

As still another example, when there are a plurality of electronic devices operable according to a voice command among the master and the slave, the master may determine an electronic device that has collected the voice most loudly among the plurality of electronic devices 100, 200, 300, and 400 as a target electronic device.

More particularly, when the air conditioner 300 and the refrigerator 400 extract a voice command of "please lower temperature", both the air conditioner 300 and the refrigerator 400 are operable according to the voice command, and thus, the master may determine the refrigerator 400, which has collected the voice more loudly, as the target electronic device.

As another example, when there are a plurality of electronic devices operable according to a voice command among the master and the slave, the master may determine an electronic device operable based on a pre-stored command pattern of a user among the plurality of electronic devices 100, 200, 300, and 400 as the target electronic device.

In this instance, the command pattern of the user may refer to information of an electronic device that the user has used at the current day and the current time during the past period.

As another example, if there is no electronic device operable according to a voice command among the master and the slave, the master may determine an electronic device operable according to the voice command among electronic devices besides the master and the slave as a target electronic device.

Specifically, when the air conditioner 300 and the refrigerator 400 extract a voice command of "start cleaning", both of the air conditioner 300, which is the slave, and the refrigerator 400, which is the master, cannot execute the voice command, and thus, the refrigerator 400 may determine a cleaner operable according to the voice command among electronic devices besides the master and the slave as a target electronic device.

As another example, if there is no electronic device operable according to a voice command among the plurality of electronic devices 100, 200, 300, and 400 connected by the network 600, the master makes one of the plurality of electronic devices 100, 200, 300, and 400 operate as a wireless router and the master transmits the voice command to the wireless router. When the target electronic device is located in a shaded area or a shadow area, the master makes an electronic device connected to the network 600 operate as a wireless router, thereby operating the target electronic device in the shaded area or the shadow area.

In the step S160 in which the voice command is transmitted, the master may transmit the voice command to the target electronic device. Specifically, the refrigerator may transmit the voice command of "start cleaning" to the cleaner.

The electronic device receiving the voice command from the master operates according to the voice command.

The master may determine the target electronic device and updates a voice command pattern of a user (S170). The master may transmit the updated voice command pattern of the user to the plurality of electronic devices 100, 200, 300, and 400 connected by the network 600 (S180).

Each of the electronic devices receiving the updated voice command pattern of the user may update its voice command pattern (S280, S380). That is, each of the electronic devices may store updated data of the voice command pattern of the user in its memory.

Although the preferred embodiments of the present disclosure have been illustrated and described above, the present disclosure is not limited to the specific embodiments described above, and the present disclosure belongs without departing from technical features of the present disclosure claimed in the claims. Also, various modifications can be made by those skilled in the art, and these modifications should not be individually understood from the technical spirit or prospect of the present disclosure.

What is claimed is:

1. A method of controlling a plurality of electronic devices connected by a network, the method comprising steps of:
   (a) collecting a voice by the plurality of electronic devices;
   (b) extracting a voice command based on information on the collected voice by each of the plurality of electronic devices;
   (c) determining one of the plurality of electronic devices collecting the voice as a master and the other of the plurality of electronic devices collecting the voice as a slave;
   (d) determining a target electronic device of the voice command through analyzing the voice command by the master; and
   (e) transmitting the voice command to the target electronic device by the master,
   wherein each of the plurality of the electronic devices connected by the network transmits whether the voice command is operable or not to the master, and
   wherein, in the step (d), when there is no electronic device operable according to the voice command among the plurality of electronic devices connected by the network, the master makes one of the plurality of electronic devices operate as a wireless router and transmits the voice command to the wireless router.

2. The method of claim 1, wherein, the step (c) is executed when the plurality of electronic devices extract the same voice command at the same time.

3. The method of claim 1, wherein, in the step (c), one of the plurality of electronic devices collecting the voice is randomly determined as the master.

4. The method of claim 1, wherein, in the step (c), an electronic device that collects the voice most loudly among the plurality of electronic devices collecting the voice is determined as the master.

5. The method of claim 1, wherein, in the step (c), an electronic device that collects the voice with the highest accuracy among the plurality of electronic devices collecting the voice is determined as the master.

6. The method of claim 1, wherein, in the step (d), the master determines an electronic device operable according to the voice command among the master and the slave as the target electronic device.

7. The method of claim 6, wherein, in the step (d), when there are a plurality of electronic devices operable according to the voice command among the master and the slave, the master determines an electronic device that collects the voice with the highest accuracy among the plurality of electronic devices collecting the voice as the target electronic device.

8. The method of claim 6, wherein, in the step (d), when there are a plurality of electronic devices operable according to the voice command among the master and the slave, the master determines an electronic device that collects the voice most loudly among the plurality of electronic devices as the target electronic device.

9. The method of claim 6, wherein, in the step (d), when there are a plurality of electronic devices operable according to the voice command among the master and the slave, the master determines one of the plurality of electronic devices operable according to the voice command based on a pre-stored command pattern of a user as the target electronic device.

10. The method of claim 1, wherein, in the step (d), when there is no electronic device operable according to the voice command among the master and the slave, the master determines an electronic device operable according to the voice command among electronic devices other than the master and the slave as the target electronic device.

11. The method of claim 1, further comprising:
    updating a voice command pattern of a user by the master.

12. The method of claim 11, wherein the master transmits the updated voice command pattern of the user to the plurality of electronic devices connected by the network.

* * * * *